United States Patent Office 2,810,086
Patented Oct. 15, 1957

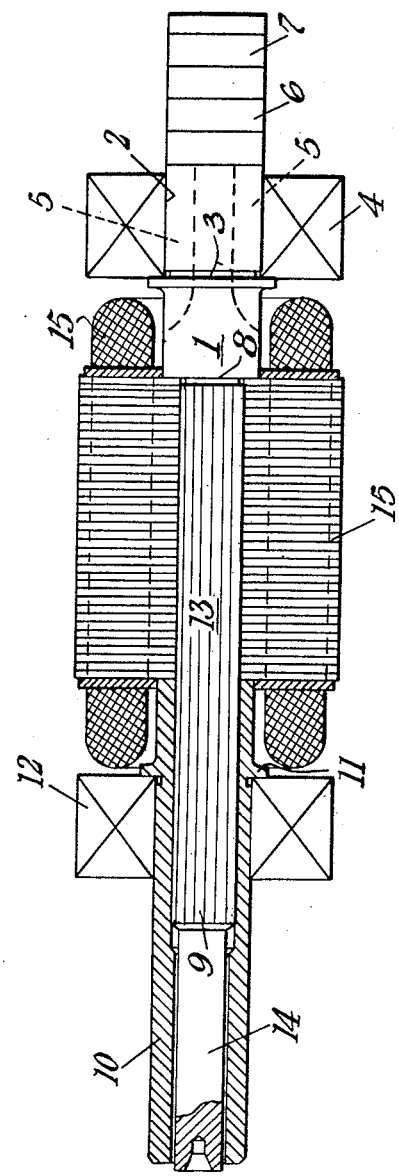

2,810,086

MINIATURE ROTATING ELECTRICAL MACHINES

Alec Ennever William Hibbitt, Sydney Norman Couzens, Robert William Watler, and John Hilary Batchelor, Beckenham, England, assignors to Muirhead & Co. Limited, Beckenham, England Application March 14, 1956, Serial No. 571,436

Claims priority, application Great Britain October 10, 1955

7 Claims. (Cl. 310—261)

This invention relates to miniature rotating electrical machines.

It is intended more particularly for use in the construction of small units for data transmission, such as synchros, which are more properly described as precision electrical instruments, but it may nevertheless be applied to the construction of other types of rotating electrical machines and to relatively larger machines.

"Synchro" is a term applied to instruments having an external stator and an internal rotor, similar to an A. C. induction motor, but intended for use in data transmission systems. Other units belonging to the same family are known as Magslips or by trade names originated by particular manufacturers for their own products, such as Selsyn, Teletorque or Autosyn.

Synchros are employed for remote indication of the position of a master element, for remote control, for automatic control of mechanical, electrical, hydraulic or pneumatic servo-mechanisms and for computing.

In order that the error in the data transmission system shall be within the narrow tolerance imposed by modern requirements, synchros of all types must be manufactured to an exceptionally high degree of precision and in addition they must be manufactured in very small sizes.

The rotor of a synchro is generally similar to that of an induction motor comprising a cylindrical pack of laminations carried on a spindle supported in ball bearings at either end but the laminations may alternatively be of H or dumbbell form. The rotor carries a winding or windings and it must be provided with sliprings for electrical connections. In a particular small size of synchro the overall diameter of the rotor laminations is only about half-an-inch. Working radially inwards, the winding in the slots occupies at least one-eighth of an inch and about one-sixteenth of an inch of lamination metal must be left below the rotor slots to secure the desired magnetic characteristics. Thus the portion of the spindle passing through the laminations cannot be more than about one-eighth of an inch in diameter.

According to the accepted pattern to which synchros have hitherto been manufactured, the spindle projects from one end, known as the mechanical end, and the electrical connections are made at the other end, which is closed and referred to as the electrical end. The projecting end of the spindle of the size of synchro referred to has a diameter of about three-sixteenths of an inch and is provided with splines and a screw-thread of standardised dimensions. In the known method of construction the spindle is formed with a shoulder at a suitable distance from its end to provide an abutment for a ball bearing. Beyond this shoulder the spindle diameter is reduced to about one-eighth of an inch and is splined to locate the circular laminations against relative rotation. Beyond the pack of laminations a second, smaller ball bearing is fitted and the sliprings are attached to the end of the spindle. Owing to the small diameter of the spindle passing through the laminations it is not possible to reduce it still further to form a screw-thread to accommodate a clamping nut for the laminations, as is usual in larger constructions. The laminations must therefore be pressed on to the spindle, with an inherent risk of bending it, or they must be cemented into position; in any case no form of mechanical clamping is possible.

The electrical connections for the sliprings must pass through the inner race of the small ball bearing and it is necessary to cut longitudinal grooves in the spindle, into which the insulated leads may be placed, thus further reducing the cross-section of the spindle. A further difficulty arises in that the electrical connections to the sliprings must be made before the bearing is mounted on the spindle; thus the overall diameter of the slipring assembly must be smaller than that of the spindle to allow the bearing to pass over it.

The slipring assembly consists of a thin sleeve of insulating material upon which the metal rings are mounted. The usual method of attachment is by means of a metal pin which is a frictionally tight fit in the insulating sleeve and is a light press fit in an axial bore in the spindle end. The drilling of this bore still further weakens the end of the spindle which becomes very delicate and liable to damage. The electrical lead to the slipring remote from the winding must pass beneath the slipring nearer the winding and the insulating sleeve, and since the permitted overall diameter of the whole assembly must be one-eighth of an inch or less, the extreme difficulty inherent in the present construction will be obvious.

It will be evident that, due to the restrictions and disadvantages in the existing design, the assembly of a small synchro is a delicate and time-consuming operation which is fraught with hazards. The vulnerability of the synchro does not end with assembly, however, since a lever, gear or other device must be mounted on the spindle when the instrument is put into use. A deliberate knock when mounting this device or an accidental knock at other times may easily cause the weak end of the spindle to bend, thus ruining an expensive instrument or, at best, impairing its accuracy.

An object of the present invention is to provide a synchro or equivalent instrument which, although of small size, is robust, well adapted to manufacture by high-precision methods and simple to assemble.

A further object is to improve the construction of miniature rotating electric machines.

The present invention consists of a rotor for a miniature rotating electrical machine comprising a spindle, a pack of laminations mounted on the spindle, a winding or windings disposed in slots or grooves in the laminations and sliprings mounted on the spindle for electrical connection to the winding or windings in which the spindle is formed by two telescopically engaging parts.

Preferably the pack of laminations is gripped between the end of one part of the spindle and a shoulder on the other part.

The two spindle parts may engage as a push fit over at least a part of their interengaging length and are conveniently cemented together.

Each of the two spindle parts is formed with an abutment for a ball bearing.

An embodiment of the invention will now be described in conjunction with the accompanying drawing.

Referring to the drawing the spindle 1 of a synchro or similar instrument has its largest diameter 2 at the inner end of which carries the sliprings. In the case of the particular size of synchro referred to above, this could be about three-sixteenths of an inch in diameter. At a convenient distance from the end of the spindle a shoulder 3 is formed to provide an abutment for a ball bearing 4. Two diametrically opposite longitudinal grooves 5 are cut in the spindle, in which the connecting leads to the sliprings pass through the inner race of the bearing to the sliprings 6 and 7, which are attached to the end of the spindle. The slipring assembly may be attached to the end of the spindle by the known method described above, or it may be moulded on to the spindle, but as the sliprings may be approximately 50% larger in diameter the problems of manufacture and assembly are correspondingly eased.

At the point indicated by reference numeral 8 the spindle diameter is reduced to the diameter 13, which is that necessary to pass through the central bore of the pack 15 of laminations, thus also forming an abutment for the pack. This portion of the spindle carries longitudinal splines which may be engaged by inward projections of the laminations, which are thus held against relative rotation. At a distance beyond the end of the pack of laminations, at the point indicated by numeral 9, the spindle is further reduced in diameter for the remainder of its length. A sleeve 10, having a length approximately equal to the distance between the end of the pack of laminations and the end of the spindle, has a uniform outside diameter (which, for the size of synchro referred to could be three-sixteenths of an inch) apart from a raised ring 11 near one end which forms an abutment for the second ball bearing 12. The end of this sleeve remote from the bearing abutment may be splined and/or screw-threaded to conform to the standard projecting spindle end of the synchro. Sleeve 10 has a stepped bore, the larger diameter of which is a light press fit on the diameter 13 of spindle carrying the laminations. The smaller diameter of this bore is a good sliding fit on the smallest diameter 14 of the spindle.

To assemble the rotor the pack of laminations is preferably first located in a suitable jig, the faces, of the laminations being coated with a metal-adhesive varnish or cement. The pack is compressed to its correct length and the varnish or cement is allowed to set. The pack is eventually removed from the jig and the spindle is inserted. The bore of sleeve 10, the portion of diameter 13 beyond the pack of laminations and diameter 14 are given a light coat of varnish or cement, and sleeve 10 is pressed on to the spindle and hard against the pack of laminations. After the varnish or cement has set winding 15 is applied and the winding impregnated if desired. The major diameter and bearing diameters may be ground at this stage, making use of centres formed in the two ends of the spindle, to ensure concentricity.

The construction shown on the drawing, in which the inner portion of spindle 1 is either flush with, or projects slightly beyond, the telescopically engaging tubular portion has the advantage that the centres in the ends of spindle 1, which are initially coaxial with all its diameters, may also be employed for the finishing operations on sleeve 10, the overall diameter of the pack of laminations and all other important diameters and faces, thus finally ensuring complete concentricity of the whole assembly to a high degree of precision.

The connecting leads from the windings are next laid in the longitudinal grooves 5 in spindle diameter 2, the slipring assembly is attached and the leads are connected to the sliprings. The bearings may now be mounted on the spindle, thus completing the assembly.

It will be apparent that the method of construction according to the invention provides a much more robust rotor, which will be less liable to accidental damage. Since more room can be allowed for insulation at vital points, for example, in the slipring assembly, the finished instrument will be less subject to electrical breakdown. Assembly is a far less delicate operation and correspondingly quicker.

In the foregoing description a particular size of synchro has been referred to. Smaller sizes will be required in the future and it will be evident that the advantages provided by the invention increase in importance as the size of the instrument becomes smaller. By the use of the construction according to the invention, it will be possible to produce synchros of a size below the limit of physical possibility with the known construction. This is of great importance where compactness is a necessity, as in control apparatus for guided weapons, equipment for aircraft, as well as certain industrial equipment.

Various modifications may be made within the scope of the invention.

We claim:

1. A rotor for a miniature rotating electrical machine comprising a spindle having a bearing diameter adjacent one end, a pack of laminations mounted on the spindle, at least one winding disposed in slots in the laminations, sliprings mounted on said one end of the spindle for electrical connections to the winding and a sleeve pressed over the other end of the spindle, the pack of laminations being located between a shoulder on the spindle and one end of the sleeve, and the sleeve incorporating a bearing diameter.

2. A rotor, as claimed in claim 1, in which the sleeve is cemented on to the spindle.

3. A rotor for a miniature rotating electrical machine comprising a spindle having a bearing diameter adjacent one end, a pack of laminations mounted on the spindle, at least one winding disposed in slots in the laminations, sliprings mounted on said one end of the spindle for electrical connections to the winding and a sleeve cemented over the other end of the spindle, the pack of laminations being located between a shoulder on the spindle and one end of the sleeve, the sleeve incorporating a bearing diameter and having a stepped bore, the larger diameter length of which is a press fit on a corresponding length of the spindle while the smaller diameter length is a sliding fit on a corresponding length of the spindle.

4. A rotor, as in claim 1, in which the part of the spindle carrying the laminations has longitudinal splines engaging the laminations to prevent rotation thereof relative to the spindle.

5. A rotor, as claimed in claim 3, in which the part of the spindle carrying the laminations has longitudinal splines engaging the laminations to prevent rotation thereof relative to the spindle.

6. A rotor, as claimed in claim 1, in which at least one longitudinal groove is formed in the spindle along the bearing diameter at the end carrying the sliprings to accommodate a connecting lead from a winding to a slipring.

7. A rotor, as claimed in claim 3, in which at least one longitudinal groove is formed in the spindle along the bearing diameter at the end carrying the sliprings to accommodate a connecting lead from a winding to a slipring.

References Cited in the file of this patent

UNITED STATES PATENTS

| 309,439 | Bradley | Oct. 2, 1888 |
| 1,612,321 | Soderberg | Dec. 28, 1926 |